Patented July 13, 1954

2,683,702

UNITED STATES PATENT OFFICE

2,683,702

HYDROPHOBIC, ORGANOPHILIC ULTRAMARINE BLUE AND PEACOCK BLUE PIGMENTS AND PROCESS OF PRODUCING THE SAME

John W. Eastes, Somerville, and Theodore F. Cooke, Martinsville, N. J., assignors to American Cyanamid Company, New York, N. Y., a corporation of Maine No Drawing. Application December 10, 1952, Serial No. 325,233

10 Claims. (Cl. 260—39)

This invention relates to improved ultramarine blue and peacock blue pigments and to a process of preparing the same. More particularly, the present invention is concerned with the preparation of ultramarine blue and peacock blue pigments having improved hydrophobic and organophilic properties which make them very valuable pigments for use in lithographic printing inks, paints, enamels, etc.

Lithographic inks are customarily prepared by incorporating the pigment into a lithographic varnish. The resulting paste is ground and the finished ink is thereafter aged.

In lithography, the surface of the printing stone must be wet with a wetting solution, usually termed lithographic fountain solution, for each impression before the ink is applied in order to prevent the ink from adhering to the non-reproducing portions of the surface. When the moistened stone is thereafter inked in the usual manner the ink adheres to the greasy or oily portion of the stone and is repelled from the moist or wet portions of the stone. The pigment used in such inks, since it must have a strong affinity for the greasy design, must be preferentially wet with hydrocarbons (organophilic) and since it must have no affinity for the wet portions of the stone it must be water-repellent (hydrophobic). Moreover, because the fountain solution usually contains a small amount of acid in order to etch the surface of the stone slightly so as to keep the lines sharp, it is extremely important that the lithographic ink have resistance to breakdown by the fountain solution as otherwise the ink is too bodied for proper flow or there is bleed and disintegration of the ink.

We have discovered a novel method of treating ultramarine blue and peacock blue pigments so as to impart thereto greatly improved hydrophobic and organophilic properties which make them especially suitable for use in lithographic inks. Additionally, the pigments of the present invention have increased chalk resistance in paints and enamels in that the blue pigments chalk blue or chalk on shade due to weathering thereof rather than chalking white as is customary with the pigments known heretofore.

Essentially, the present process involves coating ultramarine blue or peacock blue pigment particles with a small amount of a mixture or low molecular condensate of an alkylated methylol melamine and a N-alkylol fatty acid amide having a chain length of 10 to 20 carbon atoms.

In carrying out the process, the pigment is slurried with an aqueous dispersion of the aforesaid coating composition, the mixture is then dried and is thereafter cured at an elevated temperature. The resulting pigment is extremely hydrophobic, is satisfactorily organophilic and possesses good resistance to lithographic fountain solution. The final product consists of loosely-bound pigment particles coated with the coating composition in a thermocured state and the mass is readily disintegrated to yield discrete particles of pigmentary dimensions and as such are suitable for direct use as pigments. The coating is strongly adherent and is not removed when the pigment is ground in vehicles to provide a lithographic printing ink. The improved pigments of the present invention are exceedingly water-repellent as evidenced by the fact that some 300 seconds are required for wetting with water whereas similar untreated pigments are wet almost instantly upon exposure to water. Moreover, the pigments of the present invention are very readily wet by organic vehicles of the lithographic varnish type and as such are selectively retained by the lithographic ink. The adherent coating is permanent in character and is not removed or attacked by the acidic lithographic fountain solution.

The pigments of the present invention are also useful in emulsion paints, i. e., aqueous emulsions of film-forming materials. In order to obtain an emulsion of a pigmented organic film-forming material which will dry to a glossy film, it is necessary that the pigment be present entirely in the oil phase as any pigment in the water phase is deposited on the surface of the film and produces a flat surface when the water evaporates. Since the pigments of the present invention are both hydrophobic and organophilic, it is evident that they permit the formulation of emulsified oil paints which will dry to a glossy film.

A distinctly water-repellent pigment is obtained when the weight of the coating composition is at little as 0.5% of the weight of the pigment. It is preferred, however, that the pigment contain from about 2% to 10% by weight of the coating composition as in this range the pigment exhibits very satisfactory water-repellence and resistance to lithographic fountain solution.

The coating compositions referred to above may preferably be prepared by mixing one part of an alkylated methylol melamine such as methylated methylol melamine with 1 to 5 parts of a fatty acid amide such as stearamide, slightly more than 1 mol of $CH_2O$ per mol of amide, an anionic dispersing agent, and water to give about 50% solids, and heating at a pH of 8–9 until a clear solution is obtained. A temperature of about 180° C. is sufficient. The product is cooled with continuous stirring, forming a thick white paste which is stable to storage, particularly when a few percent of ammonium hydroxide are added, and may be infinitely diluted with water.

Before use, the dispersion is diluted with water to a solids content of 10%–15% to facilitate slurrying and a small amount of latent acid catalyst such as ammonium sulfate is added.

During the preparation of the coating composition, the fatty acid amide reacts with the $CH_2O$ to form N-methylolstearamide, and on further heating this at least in part reacts with the methylated methylol melamine. The product when cool appears to be a homogeneous dispersion of particles ranging in diameter from about 1 micron to about 30–50 microns and are predominantly larger than 10 microns. However, according to infrared data, the particles contain some N-methylolstearamide in uncombined form, some of the methylol melamine in combined form, and lower reaction products or polymers thereof. About 2% of the dispersing agent is used based on the combined weight of the amide and the methylated methylol melamine. The agent may be any one of the common anionic dispersing agents such as sodium stearate, the alkyl sulfonates, or the corresponding sulfates. The amount of water used is roughly equal to the weight of the other ingredients, which provides a stirrable paste of substantially maximum concentration. The methylated methylol melamine is added in the form of an aqueous solution, preferably concentrated, and for best results the methylated methylol melamine is the reaction product of a melamine containing three or more methylol groups with two or more mols of alcohol.

The invention is not limited to the use of methylated methylol melamines as illustrated above. Alkylated methylol melamines having short chain alkyl groups of not more than 4 carbon atoms, for example, the ethylated, isopropylated, and butylated methylol melamines may also be employed. In the curing, alcohol is split off and higher temperatures and longer times are required in the case of the latter compounds than in the case of methylated methylol melamine. As a result, it is preferred to use the methylated methylol melamines.

The alkylated methylol melamines which are employed are prepared by known methods. Methylol melamine may, for example, be prepared by reacting 2 to 6 mols of formaldehyde with 1 mol of melamine to form a condensation product believed to be mostly the corresponding methylol melamines. This product is then reacted with 2 to 6 mols of methanol whereby a water-soluble methylated methylol melamine is formed. The term methylated methylol melamine is intended to include all of these various substantially monomeric or polymerizable reaction products containing from 2 to 6 methylated methylol groups per molecule.

The invention is not limited to the amides referred to above. In general any fatty acid amide or thioamide having a chain length of 10 to 20 carbon atoms may be used. Included among these are such compounds as the corresponding cyanamides, ureas and thioureas, such as octadecylcyanamide, dodecylurea and hexadecylthiourea.

It is also within the scope of the present invention to react the amides referred to with formalin or other suitable aldehyde to form the N-alkylol derivatives of the amides. These derivatives may be used in the process described above equally well, in which case the step of adding $CH_2O$ may be omitted.

Preferably the fatty acid chains will be derived from saturated monocarboxylic acids. Unsaturated fatty acid groups are tolerated in amounts up to 10% of the total, but confer no advantage on the product.

In the curing step, the pigment need be maintained at a sufficiently high temperature for only sufficient time to develop the water-repellent properties of the coating. Temperatures of about 100° C. or lower may be employed, but in this range several hours are usually required. Preferably the pigment is heated for about 3–10 minutes at between about 200° C. and 100° C., as under these conditions the coated pigment can be rapidly yet uniformly cured in ordinary equipment, and a highly water-repellent and well-bonded coating is obtained. Higher temperatures may be employed causing a more rapid cure but leading to the dangers of local overheating of the pigment or non-uniformity of results. During the initial part of this heating the large particles of the melamine-amide composition soften or melt and flow around the much smaller pigment particles. On further heating the coating composition polymerizes. It is surprising that even when the weight of the composition is 10% of the weight of the pigment the product is not a cemented block of pigment particles, but instead the pigment particles are only loosely aggregated and are separated into their ultimate particles by only light disintegration.

From the foregoing it will be seen that the final product comprises ultramarine blue or peacock blue pigment particles bearing a coating comprising the thermocured water-insoluble, hydrophobic, organophilic resinous reaction product of an alkylated methylol melamine and a N-alkylol derivative of a saturated alkylamide having a chain length of 10 to 20 carbon atoms in which the N-alkylol substituent contains fewer than 4 carbon atoms, the weight of the alkylated methylol melamine to the amide being between about 1:5 and 2:1, and the weight of the cured coating being preferably between about 2% and 10% of the weight of the pigment. A ratio of about 1:1 is preferred, this ratio providing a coating of substantially maximum durability and water-repellence while appreciably reducing consumption of the alkylated methylol melamine.

The invention will be described more in detail in conjunction with the following specific examples in which the parts are by weight unless otherwise specified.

*Example 1*

A master batch of stable autodispersible colloidal stearamidemethylated methylol melamine coating composition was prepared from the following materials:

|  | Parts |
|---|---|
| Stearamide | 30.5 |
| $CH_2O$, 37% aqueous | 9.5 |
| Dimethylated trimethylol melamine (80% aqueous solution) | 38.10 |
| Potassium hydroxide | 0.5 |
| Sodium isopropyl naphthalene sulfonate | 1.64 |
| Water | 19.76 |
| Total | 100.00 |

The materials were stirred and heated at 90° C. when a clear solution resulted and then cooled to room temperature with continued stirring, the heating and cooling being rapid to minimize polymerization. The calculated solids content of the composition was about 65%, the product being a stiff paste in which the particles ranged in size from 1 micron to about 50 microns, and were predominately larger than 10 microns.

*Example 2*

32 parts of the dispersion of Example 1 were agitated with a high speed stirrer. 165 parts of water, 0.36 part 28% NH4OH and 2.4 parts (NH4)2SO4 were added and the mixture was stirred for 15 minutes. 100 parts of ultramarine blue were added and the stirring was continued for 15 minutes at which time the particles were uniformly wet. The water was then removed by heating the slurry at temperatures up to 95° C. under 25 mm. of vacuum and the resulting cake was pulverized. The pigment was heated at 145° C. for 30 minutes to cure the resin. The finished pigment was tested for water-repellency as follows:

2 parts of the finished pigment were formed into a paste with 4 parts of water until wet. The elapsed time to wet the pigment was 333 seconds, whereas a similar but untreated pigment wet practically instantaneously. In this example 20% by weight of the coating composition was applied to the pigment.

*Example 3*

16 parts of the dispersion of Example 1 were agitated with 82.8 parts of water. 0.18 part 28% NH4OH and 1.2 parts (NH4)2SO4 were added followed by a further dilution with 300 parts of water. 200 parts of ultramarine blue were added. Stirring was continued for 20 minutes at which time the particles were uniformly wet. The water was then removed by heating the slurry at temperatures up to 95° C. under 25 mm. vacuum and the resulting cake was pulverized. The pigment was then heated at 140° C. for 25 minutes to cure the resin. When two parts of the resulting pigment were pasted in 4 parts of water as in the preceding example, 61 seconds were required for wetting. In this example the weight of the coating composition amounted to 5% based on the weight of the pigment.

*Example 4*

The procedure of Example 3 was repeated except that 520 parts of pigment and 250 additional parts of water were used. In this example 2% by weight of the coating composition was applied to an ultramarine blue as specified in the preceding example.

*Example 5*

A lithographic printing ink was prepared from the pigment resulting from the treatment specified in the preceding example by grinding 36 parts of the pigment in 24 parts of No. 1 lithographic varnish. 20 parts of the resulting ink and 50 parts of lithographic fountain solution composed of 1000 parts of water, 1.3 parts of potassium acid tartrate, 10.2 parts of $$Zn(NO_3)_2 \cdot 6H_2O$$

and 18.4 parts of gum arabic, the fountain solution having a pH of 3.4-3.8 were placed in a mechanical mixer having rotating and intermeshing blades and run for 10 minutes so as to test the resistance of the ink to the fountain solution. Observations were then made for loss of flow, bleed and disintegration of the ink. These observations indicated that the ink prepared with the treated pigment had satisfactory resistance to the lithographic fountain solution.

*Example 6*

17 parts of the dispersion of Example 1 were added to 185 parts of water and the mixture was agitated until it was thoroughly dispersed. 0.2 part 28% NH4OH was added. 100 parts of concentrated Erioglaucine Lake (peacock blue) which was prepared by precipitating Erioglaucine (Color Index No. 671) on alumina hydrate with barium salts added, were added to the mixture. Stirring was continued for 30 minutes at which time the particle were uniformly wet. The water was then removed by heating the slurry up to temperatures of 95° C. under 25 mm. of vacuum and the resulting cake was pulverized. The pigment was then heated at 145° C. for 30 minutes to cure the resin. The resulting pigment when pasted in water as described in Example 1 took more than 60 seconds to wet whereas a similar untreated pigment wet almost instantaneously.

We claim:

1. A composition of matter comprising a pigment selected from the group consisting of ultramarine blue and peacock blue, the particles of which are coated with a thermocured water insoluble, hydrophobic, organophilic resinous reaction product of a short chain alkylated methylol melamine and a saturated alkylamide having a chain length of from 10 to 20 carbon atoms, and having a N-alkylol substitutent containing fewer than 4 carbon atoms, the weight of said alkylated methylol melamine to said amide being between about 1:5 and 2:1, and the weight of said coating being between about 0.5% and 20% of the weight of the pigment.

2. A composition of matter according to claim 1 wherein the pigment is ultramarine blue.

3. A composition of matter according to claim 1 wherein the pigment is peacock blue.

4. A composition of matter according to claim 1 wherein the N-alkylol group is a N-methylol group.

5. A composition of matter according to claim 1 wherein the melamine is methylated trimethylol melamine.

6. The method of producing hydrophobic, organophilic ultramarine blue and peacock blue pigments which comprises slurrying a pigment selected from the group consisting of ultramarine blue and peacock blue in an aqueous dispersion of a thermosetting resinous reaction product of a short chain alkylated methylol melamine and a saturated alkylamide having a chain length of from 10 to 20 carbon atoms and having a N-alkylol substituent containing fewer than 4 carbon atoms, drying the slurry of pigment and resinous reaction product, and heating the mixture to a temperature of between 100° C. and 200° C. to cure the resinous reaction product and develop the hydrophobic properties thereof, the weight of said alkylated methylol melamine to said amide being between about 1:5 and 2:1, and the weight of said coating being between about 0.5% and 20% of the weight of the pigment.

7. The method according to claim 6 wherein the pigment is ultramarine blue.

8. The method according to claim 6 wherein the pigment is peacock blue.

9. The method according to claim 6 wherein the amide is N-methylol amide.

10. The method according to claim 6 wherein the melamine is methylated trimethylol melamine.

References Cited in the file of this patent

UNITED STATES PATENTS

| Number | Name | Date |
|---|---|---|
| 2,525,835 | Schmutzler | Oct. 17, 1950 |